United States Patent [19]

Leung et al.

[11] 4,412,921
[45] Nov. 1, 1983

[54] DRY, PARTICULATE, INORGANIC ULTRAFILTRATION MEMBRANES AND THE PRODUCTION THEREOF

[75] Inventors: Pak S. Leung, Highland Mills; Anthony R. Cacciola, Pleasantville, both of N.Y.

[73] Assignee: Union Carbide Corporation, Danbury, Conn.

[21] Appl. No.: 254,488

[22] Filed: Apr. 15, 1981

Related U.S. Application Data

[63] Continuation of Ser. No. 879,391, Feb. 21, 1978, abandoned.

[51] Int. Cl.$^3$ .............................................. B01D 31/00
[52] U.S. Cl. .................................. 210/500.2; 427/245
[58] Field of Search ................................ 427/244–246; 428/408, 518, 472, 398; 210/321.1, 500.2, 433.2

[56] References Cited

U.S. PATENT DOCUMENTS

| | | | |
|---|---|---|---|
| 3,238,056 | 3/1966 | Pall et al. | 210/503 |
| 3,497,394 | 2/1970 | Berger | 136/153 |
| 3,926,799 | 12/1975 | Thomas et al. | 210/500.2 |
| 3,977,967 | 8/1976 | Trulson et al. | 210/500.2 |

OTHER PUBLICATIONS

Chemical Abstracts, vol. 66, 1967, p. 4632, Item 49,470 e, "Semipermeable Inorganic Bodies".

*Primary Examiner*—Frank A. Spear, Jr.
*Attorney, Agent, or Firm*—John R. Doherty

[57] ABSTRACT

A coating is applied to a microporous support in the presence of a volatile liquid capable of drawing the coating into the support and of desolvating the coating. The liquid is thereafter volatilized with the resulting dry ultrafiltration membrane being essentially crack-free and having desirable mechanical and chemical stability. The support may be pretreated with a volatile liquid, such as acetone, prior to the applying of the coating to the support. Alternately, the coating material can be dispersed in a volatile liquid, such as methanol, to form a coating suspension that is applied to the support. The coating material, preferably zirconia, will have a particle size within the range of from about 5 m$\mu$ to about 10$\mu$, with the coating having a thickness of up to about 20$\mu$. The support, such as a porous carbon tube, will have a pore volume of about 5–60% and a pore size of about 5 m$\mu$–40$\mu$. Stability is enhanced by firing the membrane at 25° C.–1500° C. preferably at about 400° C.–600° C.

21 Claims, No Drawings

DRY, PARTICULATE, INORGANIC ULTRAFILTRATION MEMBRANES AND THE PRODUCTION THEREOF

This application is a continuation of our prior U.S. application Ser. No. 879,391. Filing Date Feb. 21, 1978, now abandoned.

BACKGROUND OF THE INVENTION

1. Field of the Invention

The invention relates to ultrafiltration membranes. More particularly, it relates to the production of dry, crack-free membranes having enhanced stability.

2. Description of the Prior Art

The production and use of inorganic, semipermeable membranes for ultrafiltration purposes are well known in the art. Most such inorganic membranes are of advantage in their resistance to temperature and solvent effects. In some instances, the membranes also possess molecular perm-selectivity and ion-exchange properties. Berger, U.S. 3,497,394 thus disclosed an ion exchange membrane made by forcing a metal oxide gel into a porous support.

In the practical application of ultrafiltration membranes, high flux is an essential feature, and it has been found desirable to have a highly porous support and a thin, fine membrane. Colloidal particles thus should not be imbedded in depth into the filter body. In a dry, inorganic, semipermeable filter disclosed in French Pat. No. 1,440,105, however, fine colloidal particles are said to create a thin membrane in the surface of a porous combined membrane—support formed from a suspension of coarse and colloidal size particles of $\gamma$-$Al_2O_3$ by slip casting in a plaster mold.

Ultrafiltration membranes should also have good mechanical and chemical stability for use in practical commercial applications. Dehydration or ordinary particulate membranes always result, however, in "mud cracks" that ruin the membranes' semipermeable characteristics. In the preparation of a support surface, the formation of cracks can of course, be tolerated. In the Thomas patent, U.S. Pat. No. 3,926,799, for example, a membrane support is made by coating a zirconia slurry onto a porous substrate, followed by drying and firing the resulting composite at high temperature to form a rugged precoat. Large pores or cracks would be expected to form in this process and would be unacceptable in the formation of the membrane itself. Ultrafiltration membranes susceptible to such crack formation must be maintained wet at all times. Such membranes include those taught by the Trulson et. al. patent, U.S. Pat. No. 3,977,967, which discloses hollow tubular members having a well defined porosity and a substantially uniform, continuous, adherent, porous coating of preformed, aggregated inorganic metal oxide particles deposited thereon through permeation means. The cohesiveness of membranes of this type is due to relatively weak physical forces, and the cohesive forces between the particles, and the stability of the particulate membrane, would be enhanced by the dehydration of the metal oxide particles. Such dehydration is precluded, however, by the necessity for maintaining the membranes wet at all times to avoid the formation of cracks that would destroy the semipermeable characteristics of the membrane.

Enhanced mechanical and chemical stability are, of course, desired characteristics for inorganic ultrafiltration membranes. In addition, enhanced flexibility would be achieved by the development of ultrafiltration membranes that need not be maintained wet at all times. Thus, the handling, transport and storage of membranes would be facilitated by the elimination of this requirement.

It is an object of the invention, therefore, to provide an improved ultrafiltration membrane.

It is another object of the invention to provide a process for the production of a dry, crack-free, inorganic ultrafiltration membrane.

It is another object of the invention to provide a crack-free, mechanically and chemically stable membrane.

It is a further object of the invention to provide a stable, crack-free, dry ultrafiltration membrane having good perselectivity and flux.

With these and other objects in mind, the invention is hereinafter described in detail, the novel features thereof being particularly pointed out in the appended claims.

SUMMARY OF THE INVENTION

The objects of the invention are accomplished by the coating of a microporous support with an inorganic membrane coating material in the presence of a volatile liquid capable of drawing the coating material into the support and desolvating said coating. The desolvation of the coating, prior to the complete removal of the volatile liquid, results in a shrinking of the coating and the consequent filling of voids resulting from such shrinkage by the coating material. As a result, the development of cracks during desolvation of the coated membrane is avoided. The membrane thus produced is a dry, essentially crack-free inorganic membrane of enhanced mechanical and chemical stability. The membrane support may be pretreated with the volatile liquid prior to application of the coating or the coating material, preferably zirconia, can be dispersed in a suitable volatile liquid to form a suspension that is coated onto the membrane support. Following removal of the volatile liquid from the treated membrane, as by air drying, firing to a desolvating temperature further enhances the stability of the membrane.

DETAILED DESCRIPTION OF THE INVENTION

The ultrafiltration membrane of the invention comprises a crack-free, dry, inorganic coating anchored to a microporous support. The membrane has desirable mechanical and chemical stability, exhibiting good physical coherence, resistance to acid, alkali, soap and detergent washing and the ability to withstand ultrasonic stress and abrasion. Unlike prior art membranes that develop cracks tending to destroy their semipermeable characteristics when dry, the membranes of the invention remains essentially crack-free upon drying with their physical stability actually being improved by drying and firing.

In the process of the invention, a volatile liquid medium miscible with the membrane coating suspension is employed to draw the coating material into the membrane support and to desolvate said coating material. As a result of such desolvation, a shrinking of the coating material occurs, accompanied by a consequent filling of the voids produced as a result of said shrinkage by said coating material. Such action, made possible by the desolvation of the coating material prior to complete removal of said liquid medium, avoids the development of microscopic cracks that otherwise occur upon desolvation of the coated membrane.

In one embodiment of the process of the invention, a microporous membrane support is pretreated with a volatile liquid medium non-solvating to the coating material and capable of drawing said material into the support and of desolvating said coating material. The pretreated support is then contacted with a suspension of the coating material. After draining excess suspension from the surface of the membrane, the thus-treated membrane is exposed to a temperature capable of volatilizing the liquid medium to remove said liquid from the microporous membrane support and said coating material. As indicated above, the treated membrane may thereafter be fired, if desired, to a dehydration or desolvation temperature to enhance the stability of the membrane by sintering the coating material. The pretreatment can be carried out by wetting the entire microporous support with the volatile liquid medium until the support is saturated. This usually takes a very short time, e.g., less than a minute. While still wet, the support is contacted, on one surface, with the coating suspension, usually again for about one minute. When the porous support is of convenient tubular shape, it is generally preferred to wet the inside surface with the support tube positioned in a vertical manner. The suspension can be fed conveniently through the bottom opening of the tubular support, by gravity, injection means or vacuum so entrapped air can be avoided. The tube is filled to the top with the coating suspension, and the supply of suspension is replenished as liquid is drawn into the porous support. The coating procedure can be completed in about one minute. In treating a number of tubes at one time, sufficient space should desirably be maintained between the tubes to assure that the volatile liquid medium vaporizes freely. After the support has been coated as indicated above, excess suspension can be drained therefrom in a few seconds time. The treated tube is then air dried or otherwise exposed to a temperature capable of volatilizing the liquid medium while the tube is conveniently maintained in its vertical position. Air drying is usually carried out for about an hour.

In another embodiment, the coating material is dispersed directly in the liquid medium that is non-solvating to said coating material and is capable of drawing the coating material into the support and of desolvating the coating material. The resulting suspension is applied to the membrane support without pretreatment of the support. Excess suspension is drained away from the membrane, as in the previous embodiment, and the membrane is dried and, if desired, fired at a desolvation temperature to enhance the stability of the membrane.

It will be understood that the desolvation of the coating material by the volatile liquid medium includes not only the removal of a separate liquid employed to form a suspension of the coating material, as in the support pretreatment embodiment described above, but the possible removal of water of hydration associated with the coating material.

Removal of such water by dehydration upon drying and/or firing of conventional membranes would result in shrinkage and of the development of cracks as noted above. In the latter embodiment, the particles of coating material in the suspension are drawn into the porous surface as the solvent evaporates. The thickness of the membrane increases with contact time, however, so time control must be observed to avoid excess membrane thickness.

The membrane of the invention is formed from suspensions of inorganic refractory materials. Most such inorganic refractory materials are in the form of oxides, e.g., metal oxides. In particular, the oxides of metals of Groups III-A, III-B, IV-A, IV-B, V-A, V-B, VI-B, VII-B and VIII and lanthanides and actinides, as described in the Berger patent, U.S. Pat. No. 3,497,394, can be employed in the practice of the present invention. Zirconia is a particularly preferred coating material, as it is known to be chemically inert to strong and weak acids, alkalis and solvents, even at high temperature, and advantageous for practical commercial applications.

The finally dispersed colloidal oxides employed in the invention usually are solvated or have hydrous or hydroxyl surfaces. When deposited to form a filtration membrane, only weak van der Waals or hydrogen bonding interactions in close proximity are responsible for the cohesive force holding the membrane together. Upon heat treatment to a desolvating or dehydrating temperature, or to a sintering temperature, strong metal-oxygen-metal bonds can be formed, thus increasing the cohesion between the membrane coating particles. Unlike previous wet particulate membranes that developed macroscopic cracks due to shrinkage upon dehydration, the present invention inherently overcomes the problem of shrinkage because most of the dehydration of the particulate surface occurs by the use of said miscible, dehydrating liquid, i.e., solvent, during deposition of the membrane material. The desolvated particles are thus preshrunk and coating particles continue to fill the voids produced by solvent removal. The formation of cracks during the subsequent drying of the membrane is thereby avoided, resulting in the production of a heat-treated membrane composed mainly of dehydrated oxide, that is microporous in nature, and free of observable cracks.

The coating particles employed are in the particle size range that will form a good semipermeable filter. Typically, such particles are in the range of from about 5 m$\mu$ to about 10$\mu$, with a range of from about 10 m$\mu$ to about 1$\mu$ being generally preferred for ultrafiltration purposes. While it is generally preferred that the dispersion be in an aqueous medium for convenience in handling and good stability, it will be appreciated that other liquid media can also be employed. When the support pretreatment embodiment is employed, the suspension itself should be miscible with the pretreatment solvent. If the medium used for coating material dispersion is a volatile, nonsolvating liquid, compatible with said dispersion so as to preclude the flocculation thereof, then the alternate embodiment can be employed with direct contact of the suspension with the untreated microporous support. As noted above, however, the contact time must be carefully controlled in this embodiment as such suspensions would continue to coat the support substrate as long as they maintain contact with said substrate. An undesired thickness can thereby be formed if contact of the suspension with the support substrate is unduly prolonged. The thickness of the membrane is also influenced by the concentration of coating particles in the suspension. Concentrations of from about 0.5 to about 20% by weight based on the total weight of the suspension are generally satisfactory, depending on the type of coating material employed, with a concentration of about 6% by weight being generally preferred to form an optimum coating thickness. The membrane coating will generally be from submicron up to about 20- micron, i.e. 20μ, thickness.

The microporous support, or substrate, should consist of a material as chemically and thermally resistant as the membrane itself. Sintered metal inorganic oxides, such as metal oxides, carbon and graphite are illustrative examples of suitable substrate materials. The substrate should have a high porosity with pore sizes that can support the colloidal particles used to form the membrane coating. Thus, it is generally desirable that the substrate have a pore volume of from about 5 to about 60% with pore sizes of from about 5 mμ to about 40μ. More preferably, the substrate should have a pore volume of from about 20% to about 40%, with pore sizes of from about 100 mμ to about 2μ.

The microporous membrane support of the invention is not limited to any particular shape. Thus, the support can be flat, spiral, hollow-fiber, or any other convenient shape although tubular shapes are generally preferred. Porous carbon tubing has been found to be particularly convenient, having excellent resistance to both chemicals and high temperature. When firing such tubing, appropriate care should be taken to avoid its oxidation or the reduction of some metal oxide particles. A carbon tube having a pore volume of about 0.19 ml/g with a pore size distribution peaked at about 0.3μ has been found to constitute an especially preferred membrane support material. In coating the support, the direction of flow of the coating suspension can be inside-out or outside-in depending on various design parameters such as hydraulic flows, pressure and the like.

The volatile liquid medium used to pretreat the microporous support should be nonsolvating to the coating material and capable of drawing said material into the support and of desolvating the coating material. Said volatile liquid should thus be miscible with the coating suspension medium so as to draw the coating material into the support. It is also preferred that said liquid be volatile at a convenient temperature, such as from about 15° C. to about 100° C. Most ketones and alcohols are suitable pretreatment liquids, with acetone and methanol being preferred liquids, and with acetone being particularly preferred and highly suitable for use in conjunction with aqueous suspensions of the coating material. In the embodiment in which the coating material suspension medium is volatile and is a nonsolvating liquid to the particles, the coating operation can be carried out directly without membrane support pretreatment, the suspension medium serving to draw the coating material into the support and to desolvate said coating material particles. Methanol is a suitable suspension medium for use in this embodiment of the invention, and can readily be employed as a suspension medium for the preferred zirconia coating material without pretreatment of the supporting substrate.

The exposing of the treated membrane to a temperature capable of volatilizing the liquid medium to remove it from the membrane support and coating material can readily be accomplished in the atmosphere, i.e., by air drying as at from about 15° C. to about 100° C. If prolonged and high temperature is required for an oxidizable material, such as carbon and metals, the baking can be carried out in an inert atmosphere. The temperature should be above the desolvation or dehydration temperature. When firing to enhance the stability of the membrane, temperatures above that at which the particles will be sintered should advantageously be employed. Firing will generally be at a dehydration or desolvation temperature in the range of from about 25° C. to about 1500° C., more particularly from about 60° C. to about 1200° C. Firing temperatures in the range of from about 400° C. to about 600° C., with firing times on the order of thirty minutes, have been preferred. The furnace can be preheated to a desired temperature, or the temperature can be raised gradually while the membrane and support are in place. The temperature is usually brought gradually up to a preset maximum and then held for a period of from about ten minutes to a couple of hours.

Fired zirconia membranes prepared in accordance with the invention have been found to maintain the coating after exposure to a circulating wash employing acid base, detergent and soap washes, and to abrasion and ultrasonic tests. A conventional wet membrane as described above, on the other hand, was found to have only partial retention in acidic, base and detergent circulating washes. The coating of the conventional membrane was found also to have sloughed off upon exposure to a circulating soap wash and upon exposure to abrasion and ultrasonic tests. Whereas the membrane of the invention had good rejection properties on drying, the conventional wet membrane had poor rejection properties when dry. Because of its superior stability, a stable hydrous zirconia coating can be permanently deposited onto the membrane of this invention to provide it with a hyperfiltration characteristic that can be used for the retention of low molecular weight macromolecules. The invention is further illustrated by the following examples falling within the scope of the invention disclosed and claimed herein.

EXAMPLE 1

A microporous carbon tube having a length of 63.5 cm, an inside dia. of 6 mm, an outside dia. of 10 mm, and a pore volume of 0.185 $cm^3/g$ was employed as the membrane support. 75% of the pores were between 0.1 mμ and 1.0 mμ, with the peak distribution at about 0.3 mμ. About 0.025 $cm^3/g$ of the tube had pores of from about 2 to about 10μ. The air permeation rate of the tube was about 1500 $cm^3$/min. at 25° C. and 0.68 atm. differential pressure. Water flux was measured at about 200 ml/min. at 38° C. and 6.8 atm. The tube was tilted on one end, and sufficient acetone was introduced from the top opening until the tube was full, with additional acetone being supplied as the level decreased due to absorption. Upon saturation in about 30 seconds, the acetone was drained from the tube. A suspension of zirconia was then quickly injected through the bottom cork seal until the tube was full. The suspension was held in the tube in the vertical position for one minute with the level of the suspension maintained at the top opening continuously, after which the suspension was drained from the tube. The tube was then air dried in a vertical position for one hour. It was then fired in a furnace, starting at 25° C. and with the temperature increased to 650° C. in about 15 minutes and maintained at that temperature for an additional 15 minutes. The coating suspension was a 6% weight/per volume aqueous suspension of zirconia (88%) stabilized with yttria (12%). The particle surface area was about 45 $m^2/g$ having an aggregate size of 0.1 to 1.0μ. The coated tube was found to have about 1.7 mg/$cm^2$ of zirconia on the carbon tube. The essentially crack-free membrane coating remained intact after washing for 10 minutes with circulating water, then with 0.5% aqueous oxalic acid for 20 minutes, and then with 0.1 M NaOH for 10 minutes, and finally again with water for 10 minutes. The coating likewise remained intact in an ultrasonic test in which a one inch piece of the coated tube was broken open, submerged in a 200 ml beaker half filled with water and subjected to an ultrasonic stress of $2 \times 10^4$ cps at about 70 watts for 15 minutes. After measuring the water flux which was 173 gfd (gallons per square foot per day) at 60 psi and 40° C., the membrane was tested with a 1% soluble oil in water emulsion using Texaco C cutting oil as a feed at a flux of 173 gfd at 60 psi and 40° C., with 2.5 gpm circulation. Rejection of emulsified oil by turbidity testing was 99.5%. Concentration was carried out until a 5% oil concentration was reached. The flux at this point was 167 gfd at 60 psi and 40° C. with 2.5 gpm circulation. Rejection of emulsified oil, by turbidity test, was 99.7%. A separate zirconia membrane prepared in the same manner on the same type tube was tested with dyed Ficoll 400 M, a 400,000 mol. wt hydrolyzed starch. Rejection of better than 99% was observed.

EXAMPLE 2

A membrane was prepared by the procedure of Example 1 except that the acetone pretreatment was omitted. The suspension was prepared by diluting one volume of a 30% aqueous zirconia suspension with methanol to a total of five volumes. Using the evaluation procedures and conditions of Example 1, the crack-free membrane of the invention achieved the following results: water flux-180 gfd; flux at the beginning feed concentration of 1% oil-177 gfd, with a rejection of 99.8%; and flux after concentration to 5% oil-173 gfd with a rejection of 99.8%.

EXAMPLE 3

A fired zirconia membrane was prepared as in Example 1 except that an alumina tube was employed as the membrane support. The tube had an initial water-wetted bubble point pressure of 22 psi in air. Performance under the same conditions and procedures as in Example 1, for said 1% cutting oil, were: flux-340 gfd; rejection-98.4%.

EXAMPLE 4

A zirconia membrane was prepared on a carbon tube, as in Example 1, except that the maximum furnace temperature for firing was 1100° C. for one hour under a nitrogen atmosphere. Performance under the conditions and procedures of Example 1 give a water flux of 306 gfd and a flux for 1% oil of 272 gfd, with a rejection of 99.4%.

EXAMPLE 5

The procedure of Example 1 were again employed, except that the coating suspension was made from 5% tantalum oxide. The particles had an initial surface area of 5.14 m²/g, and were ground with ceramic balls at a pH of 4 for 72 hours. Performance under the conditions and procedures of Example 1 were: water flux-258 gfd; flux for 1% oil-200 gfd, with a rejection of 96%.

In other applications of the invention, various other alternatives were employed, e.g., employing methyl ethyl ketone as the pretreatment volatile liquid in the preparation of a zirconia membrane in accordance with the procedures of Example 1 and, likewise employing said procedures, except for the substitution of silica in place of zirconia for the production of a silica membrane. In other applications, zirconia membranes can be prepared in a variety of porous support materials, such as a porous sintered metal tube, a fiber glass tube, a paper tube and the like.

The ultrafiltration membrane of the invention, in its various embodiments, represents a significant advance in the art. In addition to having good flux and rejection properties, the membrane resists chemicals, detergents and extremes of pH and temperature and has a superior stability to previously available particulate membranes. By providing these advantages in a dry, crack-free membrane, the invention overcomes the appreciable limitations and restrictions heretofore encountered and provides greatly enhanced flexibility in the handling, storage and application of inorganic ultrafiltration membranes.

What is claimed is:

1. A process for the production of a dry, inorganic ultrafiltration membrane comprising:
   (a) pretreating a microporous membrane support with a volatile liquid medium prior to the coating of said support with a membrane coating material, said liquid medium being non-solvating to said coating material and capable of drawing said coating material into said support and of desolvating said coating material;
   (b) coating the surface of said pretreated microporous membrane support with said membrane coating material; and
   (c) exposing the thus-coated membrane to a temperature capable of volatilizing said liquid medium to remove said liquid medium from the microporous membrane support and said membrane coating material, whereby the desolvation of said coating material prior to completion of removal of said liquid medium results in a shrinking of the coating material and the consequent filling, by said coating material, of voids produced as a result of said shrinking, thus avoiding the development of microscopic cracks that otherwise occur upon desolvation of the coated membrane, thereby forming an essentially crack-free mechanically and chemically stable membrane.

2. The process of claim 1 in which said pretreated membrane support is contacted with a suspension of said membranes coating material, said volatile liquid medium being miscible with said coating suspension.

3. The process of claim 2 in which said coating suspension comprises an aqueous suspension.

4. The process of claim 3 in which said support comprises a porous carbon tube and said coating material is coated on the inner surface of said tubing.

5. The process of claim 2 and including draining excess suspension from the surface of said membrane support, said exposing of the treated membrane to a temperature capable of volatilizing said liquid medium comprising air drying said membrane at a temperature of from about 15° C. to about 100° C.

6. The process of claim 5 and including firing the thus-treated membrane at a temperature of from about 25° C. to about 1500° C., said firing enhancing the stability of said membrane.

7. The process of claim 6 in which said firing temperature is from about 60° C. to about 1200° C.

8. The process of claim 7 in which said firing temperature is from about 400° C. to about 600° C.

9. The process of claim 7 in which said membrane coating material is taken from the group consisting of the oxides of the metals of Groups III-A, III-B, IV-A, IV-B, V-A, V-B, VI-B, VII-B and VIII, lanthanides and actinides.

10. The process of claim 9 in which said coating material comprises zirconia.

11. The process of claim 10 in which said zirconia has a particle size of from bout 5 m$\mu$ to about 10$\mu$.

12. The process of claim 11 in which said particle size is from about 10 m$\mu$ to about 1$\mu$.

13. The process of claim 10 in which said coating suspension comprises an aqueous suspension and said liquid medium comprises acetone.

14. The process of claim 13 in which said membrane support has a pore size of from about 5 m$\mu$ to about 40$\mu$ and a pore volume of from about 5% to about 60%.

15. The process of claim 14 in which said support comprises a porous carbon tube having a pore size of from about 100 m$\mu$ to about 2$\mu$ and a pore volume of from about 20% to about 40%.

16. The process of claim 13 in which said support comprises a porous carbon tubing and said coating material is coated on the inner surface of said tube.

17. The process of claim 2 in which said liquid medium comprises an alcohol or ketone volatile at a temperature of from about 15° C. to about 100° C.

18. The process of claim 17 in which said liquid medium comprises acetone.

19. A process for the production of a dry, inorganic ultrafiltration membrane comprising:
    (a) pretreating a microporous membrane support with a liquid medium comprising an alcohol or ketone volatile at a temperature of from about 15° C. to about 100° C.;
    (b) coating the surface of said pretreated microporous membrane support with a membrane coating material selected from the group consisting of the oxides of the metals of Groups III-A, III-B, IV-A, IV-B, V-A, V-B, VI-B, VII-B and VIII, lanthamides and actinides;
    (c) exposing the thus-coated membrane to a temperature capable of volatilizing said liquid medium to remove said liquid medium from the microporous membrane support and said membrane coating material, whereby the desolvation of said coating material prior to completion of removal of said liquid medium results in a shrinking of the coating material and the consequent filling, by said coating material, of voids produced as a result of said shrinking, thus avoiding the development of microscopic cracks that otherwise occur upon desolvation of the coated membrane, thereby forming an essentially crack-free mechanically and chemically stable membrane.

20. A process for the production of a dry, inorganic ultrafiltration membrane comprising:
    (a) pretreating a porous carbon tube with a liquid medium comprising an alcohol or ketone volatile at a temperature of from about 15° C. to about 100° C., said porous carbon tube having a pore size of from about 100 m$\mu$ to about 2$\mu$ and a pore volume of from about 20% to about 40%;
    (b) coating the surface of said pretreated porous carbon tube with a membrane coating material selected from the group consisting of the oxides of the metals of Group III-A, III-B, IV-A, IV-B, V-A, V-B, VI-B, VII-B and VIII, lanthamides and actinides;
    (c) exposing the thus-coated carbon tube to a temperature capable of volatilizing said liquid medium to remove said liquid medium from the porous carbon tube and said membrane coating material whereby the desolvation of said coating material prior to completion of removal of said liquid medium results in a shrinking of the coating material and the consequent filling, by said coating material, of voids produced as a result of said shrinking, thus avoiding the development of microscopic cracks that otherwise occur upon desolvation of the coated membrane; and
    (d) firing the thus treated membrane at a temperature of from about 25° C. to about 1500° C., said firing enhancing the stability of said membrane.

21. A dry inorganic ultrafiltration membrane produced by the process defined in any one of claims 1, 19, 20 and 2 to 18, inclusive.

* * * * *

UNITED STATES PATENT AND TRADEMARK OFFICE
CERTIFICATE OF CORRECTION

PATENT NO. : 4,412,921
DATED : November 1, 1983
INVENTOR(S) : Pak S. Leung and Anthony R. Cacciola It is certified that error appears in the above-identified patent and that said Letters Patent is hereby corrected as shown below:

Col. 1, line 38 - "or" should be "of".

Col. 4, line 27 - "microscopic" is misspelled.

Col. 8, line 45 (Claim 2) - "membranes" should be "membrane".

Signed and Sealed this

Fifth Day of June 1984

[SEAL]

Attest:

Attesting Officer

GERALD J. MOSSINGHOFF

Commissioner of Patents and Trademarks